United States Patent
Garrett et al.

(10) Patent No.: US 11,054,599 B2
(45) Date of Patent: Jul. 6, 2021

(54) SUBMARINE CABLE BRANCHING UNITS WITH FIBER PAIR SWITCHING

(71) Applicant: SUBCOM, LLC, Eatontown, NJ (US)

(72) Inventors: Lara Denise Garrett, Red Bank, NJ (US); Haifeng Li, Morganville, NJ (US); Thomas Marino, Jr., Eatontown, NJ (US); Georg Heinrich Mohs, East Brunswick, NJ (US); Massimo Manna, New York, NY (US)

(73) Assignee: SUBCOM, LLC, Eatontown, NJ (US)

( * ) Notice: Subject to any disclaimer, the term of this patent is extended or adjusted under 35 U.S.C. 154(b) by 16 days.

(21) Appl. No.: 16/525,757

(22) Filed: Jul. 30, 2019

(65) Prior Publication Data

US 2020/0033542 A1 Jan. 30, 2020

Related U.S. Application Data

(60) Provisional application No. 62/712,167, filed on Jul. 30, 2018.

(51) Int. Cl.
*G02B 6/44* (2006.01)
*H04J 14/02* (2006.01)
*H04B 3/44* (2006.01)
*H04B 10/80* (2013.01)

(52) U.S. Cl.
CPC ........ *G02B 6/4427* (2013.01); *H04J 14/0221* (2013.01); *H04B 3/44* (2013.01); *H04B 10/808* (2013.01)

(58) Field of Classification Search
CPC ..... G02B 6/4427; H04J 14/0221; H04B 3/44; H04B 10/808
See application file for complete search history.

(56) References Cited

U.S. PATENT DOCUMENTS

| | | | |
|---|---|---|---|
| 6,249,620 B1 * | 6/2001 | Simeonidou ........ | H04J 14/0212 385/16 |
| 2010/0290786 A1 * | 11/2010 | Abbott ................ | H04J 14/0205 398/79 |
| 2011/0311216 A1 * | 12/2011 | Inoue .................. | H04J 14/0213 398/1 |

(Continued)

OTHER PUBLICATIONS

Garrett, L., "Evolution of Reconfigurable Submarine Fiberoptic Networks," 2019 24th Optoelectronics and Communications Conference (OECC) and 2019 International Conference on Photonics in Switching and Computing (PSC), The Institute of Electronics, Information and Communication Engineers (IEICE), Jul. 7, 2019, 1-3.

(Continued)

*Primary Examiner* — Mina M Shalaby
(74) *Attorney, Agent, or Firm* — Kacvinsky Daisak Bluni, PLLC

(57) ABSTRACT

Submarine cable branching units with fiber pair switching configured to allow any number of trunk cable fiber pairs to access the optical spectrum any number of branch cable fiber pairs. Access to a particular branch terminal is not limited to predefined subset of the trunk fiber pairs. This approach allows fewer branch cable fiber pairs to be equipped in each branching unit, reducing system cost, simplifies system planning and provides flexible routing of overall trunk cable capacity.

20 Claims, 4 Drawing Sheets

(56) References Cited

U.S. PATENT DOCUMENTS

| | | | | |
|---|---|---|---|---|
| 2012/0177362 A1* | 7/2012 | Zhang | ................ | H04B 10/0773 |
| | | | | 398/9 |
| 2012/0243879 A1* | 9/2012 | Nashimoto | .......... | H04B 10/293 |
| | | | | 398/140 |
| 2013/0259055 A1* | 10/2013 | Ji | ....................... | H04Q 11/0005 |
| | | | | 370/400 |
| 2014/0037284 A1* | 2/2014 | Aida | ................... | H04J 14/0205 |
| | | | | 398/7 |
| 2014/0099098 A1* | 4/2014 | Wang | ................ | H04J 14/0227 |
| | | | | 398/7 |
| 2015/0200743 A1* | 7/2015 | Kamalov | ............. | H04J 14/021 |
| | | | | 398/85 |
| 2016/0308638 A1* | 10/2016 | Zhang | ................ | H04J 14/0205 |

OTHER PUBLICATIONS

European Search Report dated Nov. 27, 2019 for European Patent Application No. 19189244.7.

* cited by examiner

SUBMARINE CABLE BRANCHING UNITS WITH FIBER PAIR SWITCHING

This application claims the benefit of priority to, U.S. Patent provisional Application No. 62/712,167, filed Jul. 30, 2018, entitled "Submarine Cable Branching Units with Fiber Pair Switching," which application is incorporated herein by reference in its entirety.

TECHNICAL FIELD

The present disclosure relates to optical transmission systems, and, in particular, to submarine cable branching units with fiber pair switching.

BACKGROUND

Submarine optical cables are laid on the sea bed or ocean floor between land-based terminals to carry optical signals across long stretches of ocean and sea. The optical cables include several optical fiber pairs and other components such as strengthening members, a power conductor, an electrical insulator, a protective shield etc. The optical fibers may be single core/mode fibers or multi-mode/core fibers. The first fiber of a fiber pair may be coupled in the system for communicating signals in a first direction on the cable and the second fiber of the fiber pair may be configured for communicating signals in a second direction, opposite the first direction, on the cable. The system thus supports bi-directional communication.

In a branched submarine optical communication system, a trunk cable may extend between first and second land-based trunk terminals. The trunk cable may include a number of trunk cable segments coupled between optical amplifiers for amplifying the optical signals and may have one or more branching units coupled thereto. Each branching unit may be connected to a branch cable that terminates in a transmitting and/or receiving land-based branch terminal. The branch cable may include a number of branch cable segments coupled between optical amplifiers for amplifying the optical signals.

The individual fiber pairs in one submarine optical cable have traditionally been controlled by different owners. As such, the capacity of a single fiber pair has been the important commodity shared through undersea branching units among multiple terminals/cable landing sites. To facilitate this, each branching unit may include one or more optical add/drop multiplexers. Channels or wavelengths of a signal may be added to and/or dropped from the trunk cable via the optical add/drop multiplexers to direct optical signals on selected channels to and from the branch terminals.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent with the present disclosure allows any number of trunk cable fiber pairs to access the optical spectrum of any number of branch cable fiber pairs. For example, a system consistent with the present disclosure may be configured to allow eight trunk cable fiber pairs to each connect to a single "eastbound" branch cable fiber pair and single "westbound" branch cable fiber pair.

This approach allows fewer branch cable fiber pairs to be equipped in each branching unit, reducing system cost, and provides flexible routing of overall trunk cable capacity, because access to a particular branch terminal is not limited to predefined subset of the trunk fiber pairs. This approach also simplifies system planning since it eliminates the need to pre-plan which trunk cable fiber pairs are routed to the branch terminal.

Figure 1:
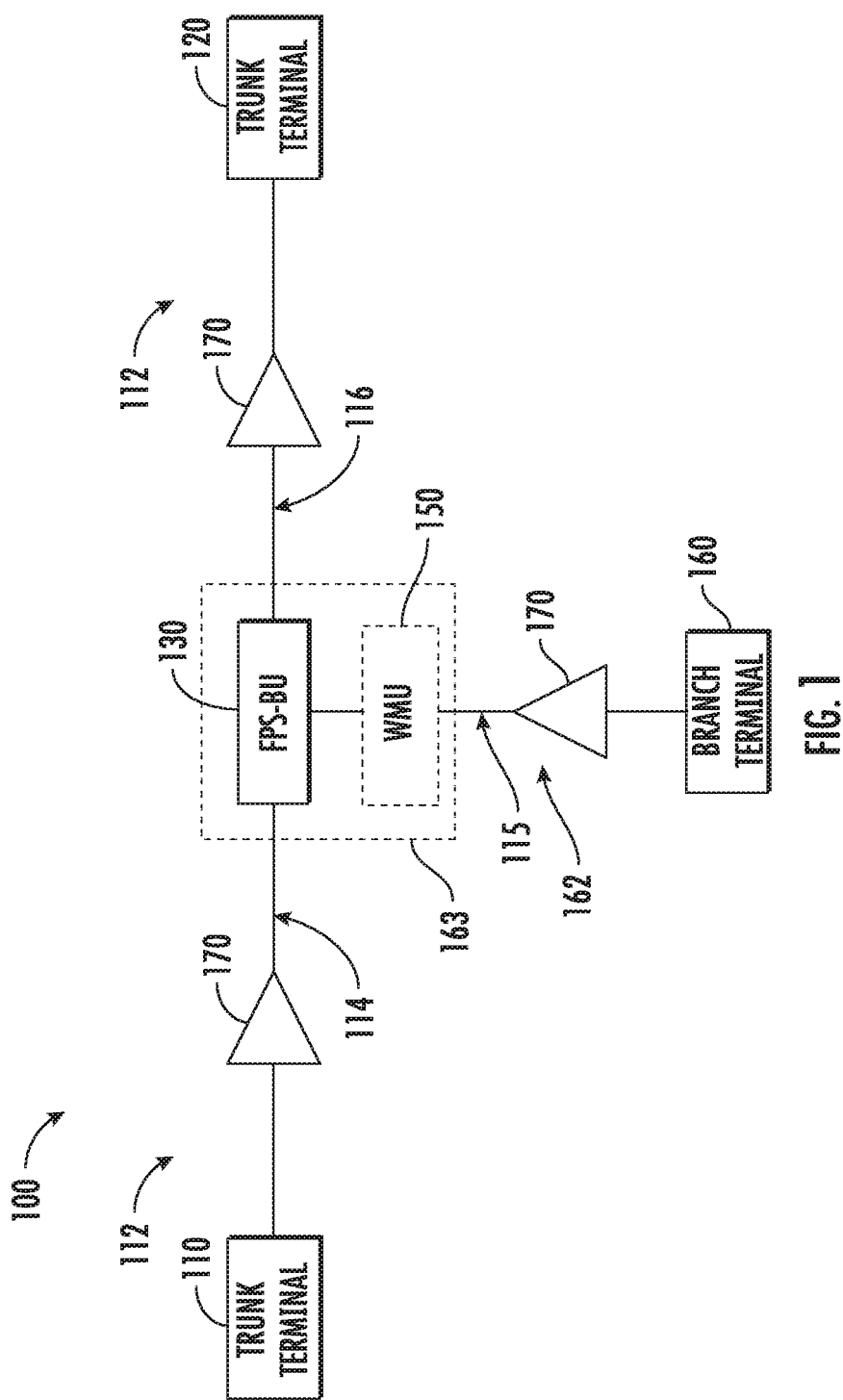
FIG. 1 is a schematic illustration of one example of an optical communication system consistent with the present disclosure.

FIG. 1 illustrates an exemplary branched optical communication system 100 consistent with the present disclosure. The system 100 has been depicted in highly-simplified form for ease of explanation. The illustrated system 100 includes land-based trunk terminals 110 and 120 coupled to a trunk cable 112, and a land-based branch terminal 160 coupled to the trunk cable 112 through a branch cable 162. In some embodiments, the system 100 may be configured as a long-haul system, e.g. having a length between at least two of the terminals of more than about 600 km, which spans a body of water, e.g. an ocean. The trunk cable 112 may thus span between beach landings.

The trunk cable 112 and the branch cables 162 may both include a plurality of optical cable segments, e.g. cable segments 114, 115, 116 for carrying optical signals, e.g. wavelength division multiplexed (WDM) optical signals. Each cable segment may include one or more sections of optical cable and one or more repeaters 170. Each section of optical cable may take a known configuration including a plurality of fiber pairs, one or more layers of strengthening members, an electrical power conductor, an insulator, and armored cover portion. The optical fiber pairs and the power conductor of the optical cable are covered and protected within the cable by the armored cover portion, members, and a protective cover.

The system 100 may therefore be configured to provide bi-directional communication of optical signals between any of the terminals 110, 120, 160. For ease of explanation, the description herein may refer to transmission from one terminal to another. It is to be understood, however, that the system 100 may be configured for bi-directional or uni-directional communication between any number of the terminals 110, 120, 160.

The components in the trunk 112 and branch 162 cables may include any of a variety of configurations for achieving their intended functionality. The repeaters 170, for example, may include an optical amplifier/repeater configuration that compensates for signal attenuation on the transmission path. For example, one or more of the repeaters may be configured as an optical amplifier, such as an erbium-doped fiber amplifier (EDFA), a Raman amplifier, a hybrid Raman/EDFA amplifier, or a semiconductor optical amplifier (SOA). Also, one or more of the repeaters may be provided in an optical-electrical-optical configuration that regenerates an optical signal by converting it to an electrical signal, processing the electrical signal and then retransmitting the optical signal.

Consistent with present disclosure, at least one fiber pair switching branching unit (FPS-BU) 130 may be coupled to the trunk cable between the trunk terminals 110, 120. As will be described in greater detail below, the FPS-BU 130 is configured to allow remote and selectively controllable routing of trunk cable fiber pairs to branch cable fiber pairs. In some embodiments, the FPS-BU 130 is configured to allow remote and selectively controllable routing of two or more trunk cable fiber pairs to a fewer number of branch cable fiber pairs. Although the FPS-BU 130 is illustrated as a single element in FIG. 1, it is to be understood that the functionality of the FPS-BU 130 may be integrated into a single element disposed in a single housing, or portions of the functionality may be physically separate from each other, e.g. by several kilometres or by one or more water depths to allow the elements to be retrieved from an ocean floor for repair or replacement independently of one another.

The FPS-BU 130 may be associated with an optional wavelength management unit (WMU) unit 150. The WMU 150 may be configured to provide selective wavelength filtering of the signals on the branch cable fiber pairs coupled to the FPS-BU 130. The WMU 150 may, for example, include wavelength selective elements (e.g., filters) for providing a desired wavelength allocation and may also include optical connections (e.g. optical couplers) for coupling the allocated wavelengths between FPS-BU 130 and the branch 162 cables. A variety of configurations for the WMU 150 are possible depending on the desired application.

Examples of optical devices that may be used to provide WMU 150 functionality include, without limitation, optical switches, couplers, tunable optical filters, variable optical attenuators, wavelength selective switches (WSSs), and reconfigurable optical add drop multiplexers (ROADMs). In one embodiment, for example, the WMU 150 may include a separate WSS coupled to each input and output of the FPS-BU 130 to the branch cable 162 for selectively and controllably determining which wavelengths are added/dropped to/from the branch cable 162.

Although illustrated a separate element in FIG. 1, the WMU 150 may be integral with the FPS-BU 130 or a portion thereof, i.e. incorporated into the housing of the FPS-BU 130, or may be physically separate therefrom, e.g. by several kilometers or one or more water depths. The FPS-BU 130 and the optional WMU 150 may be coupled to the branch terminal 160 through the branch cable 162. The FPS-BU 130 and WMU 150 may together form a branching configuration 163. The FPS-BU 130 allows selectively controllable routing of trunk cable fiber pairs to branch cable fiber pairs and, optionally via the WMU 150, directs optical signals to and from the branch cable 162 and branch terminal 160, by dropping and adding allocated channel wavelengths.

Figure 2:
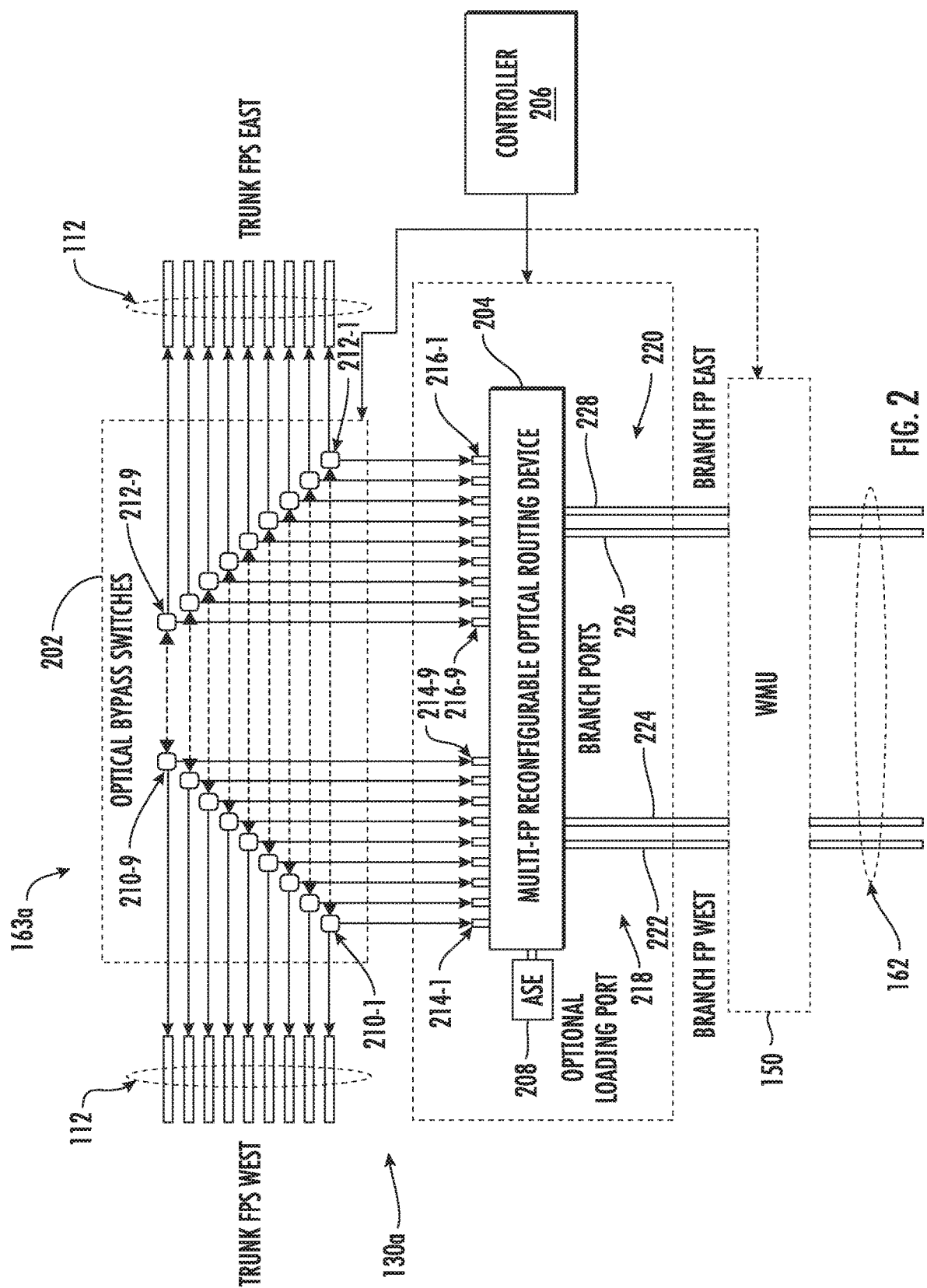
FIG. 2 is a functional block diagram of one example of a fiber pair switching branching unit consistent with the present disclosure.

FIG. 2 illustrates one example of a branching configuration 163a consistent with the present disclosure. The illustrated example branching configuration 163a includes a FPS-BU 130a and an optional WMU 150. The FPS-BU 130a includes an optical bypass switch portion 202, a controllable optical routing device (RORD) 204, and a controller 206. The branching configuration 163a is coupled between a west portion of an optical cable 112, an east portion of an optical cable 112 and a branch cable 162. For simplicity and east of description, the terms west and east, and other directional or positional terms, may be used herein to describe the general relative orientation or position of components or elements of a system. These terms are not limited to the specific directions, e.g. west or east, referenced but are instead used to describe relative orientation, e.g. opposite sides or directions of travel.

The bypass switch portion 202 of the FPS-BU 130a includes a plurality of west side optical switches 210-1 . . . 210-9 and a plurality east side optical switches 212-1 . . . 212-9. The optical switches 210-1 . . . 210-9, 212-1 . . . 212-9 may be configured with any known optical switch technology. As will be understood by those of ordinary skill in the art, each optical switch may be configured to adjust a light beam and/or an optical fiber to perform a switching operation. For example, the optical switches may utilize microelectromechanical systems (MEMS) to adjust a micro-mirror to controllably couple a signal on an input path to an output path.

Each of the west side optical switches 210-1 . . . 210-9 is coupled to an associated trunk cable fiber pair (FP) of the portion of the trunk cable 112 to the west of the FPS-BU 130a. Each of the west side optical switches 210-1 . . . 210-9 is configured to selectively and controllably couple the trunk cable fiber pair coupled thereto to either an associated input port of the RORD 204 or to an associated one of the east side optical switches 212-1 . . . 212-9. Each of the east side optical switches 212-1 . . . 212-9 is coupled to an associated trunk cable fiber pair (FP) of the portion of the trunk cable 112 to the east of the FPS-BU 130a. Each of the east side optical switches 212-1 . . . 212-9 is configured selectively and controllably couple the trunk cable fiber pair coupled thereto to either an associated input port of the RORD 204 or to an associated one of the west side optical switches 210-1 . . . 210-9. With this configuration, the west side switches 210-1 . . . 210-9 and east side switches 212-1 . . . 212-9 can be selectively controlled to couple any one or more of the fiber pairs from the west side of the trunk cable 112 and/or the east side of the trunk cable 112 to the RORD 204 or to the corresponding trunk fiber pair coupled to the opposite side of the FPS-BU 130a.

The illustrated example embodiment shows nine fiber pairs in the trunk cable 112 and nine west side optical switches 210-1 . . . 210-9 and east side optical switches 212-1 . . . 212-9. It is to be understood, however, that a system consistent with the present disclosure may be configured to operate with a trunk cable 112 having any number of fiber pairs, and optical switches may be coupled to all, or only a portion of, the fiber pairs on the west or east side of the FPS-BU 130a.

The RORD 204 includes a number of west side ports 214-1 . . . 214-9 and a number of east side ports 216-1 . . . 216-9 configured to be selectively coupled to associated trunk cable fiber pairs through the west 210-1 . . . 210-9 and east side switches 212-1 . . . 212-9, respectively, and an optional amplified spontaneous emission (ASE) port 208 for receiving an ASE noise source input. Each of the west side ports 214-1 . . . 214-9 of the RORD 204 is coupled to an associated one of the west side switches 210-1 . . . 210-9 and each of the east side ports 216-1 . . . 216-9 of the ROR is coupled to an associated one of the east side switches 212-1 . . . 212-9.

The RORD 204 also includes ports for west side fiber pair 218 of the branch cable 162 and ports for an east side fiber pair 220 of the branch cable. One fiber 222 of the west side fiber pair 218 may be a drop fiber for dropping signals from the trunk cable 112 to the branch cable 162 and the other fiber 224 of the west side fiber pair 218 may be an add fiber for adding signals from the branch cable 162 to the trunk cable 112. One fiber 226 of the east side fiber pair 220 may be a drop fiber for dropping signals from the trunk cable 112 to the branch cable 162 and the other fiber 228 of the east side fiber pair 220 may be an add fiber for adding signals from the branch cable 162 to the trunk cable 112.

In the illustrated example, the RORD 204 includes nine west side ports 214-1 . . . 214-9 and nine east side ports 216-1 . . . 216-9 for a total of eighteen input ports, and includes ports for the west 218 and east 220 side fiber pairs of the branch cable 162. It is to be understood however that an RORD 204 consistent with the present disclosure may include any number N of ports for coupling to trunk cable fiber pairs and any number M of ports for coupling to branch cable fiber pairs. In some embodiments, N is 2 or more and N>M.

The RORD 204 is configured to selectively and controllably couple any of the N ports coupled to the trunk cable fiber pairs to any of the M ports coupled to the branch cable fiber pairs. The RORD 204 may also be configured to couple any of the M ports coupled to the branch cable fiber pairs to another one of the M ports coupled to the branch cable fiber pairs. To provide noise loading the RORD 204 may also be configured to route ASE noise from the ASE port 208 to any of the N or M fiber pairs. The RORD 204 can be provided in a variety of configurations, depending on the application. Examples of optical devices that may be used to provide RORD 204 functionality include, without limitation, optical switches, couplers, tunable optical filters, variable optical attenuators, and wavelength selective switches (WSSs).

The RORD 204 may be integral with the bypass switch portion 202 and incorporated inside the same housing, or may be physically separate therefrom, e.g. by several kilometers or one or more water depths. Also, the M ports coupled to the branch cable fiber pairs may be directly coupled to the branch terminal or indirectly coupled to the branch terminal through the WMU 150. As described above, the WMU 150 may be configured to provide selective wavelength filtering of the signals on the branch cable fiber pairs coupled to the FPS-BU.

Selective control of the state of the optical switches 210-1 . . . 210-9, 212-1 . . . 212-9, the RORD 204 and the optional WMU 150 may be performed by the controller 206 in response to a remote command signal. The controller 206 may be configured to receive the remote command signal from a terminal, e.g., trunk terminals 110, 120 and/or branch terminals 160. For example, the remote command signal may be transmitted on a supervisory channel of a wavelength division multiplexed (WDM) signal transmitted on the trunk or branch cable. The supervisory channel may be directed to the controller 206 and the controller 206 may extract the command signal from the supervisory channel. The controller 206 may then provide a signal representative of the remote command signal to each of the optical switches 210-1 . . . 210-9, 212-1 . . . 212-9, the RORD 204 and/or the optional WMU 150 to, e.g., configure the state of the switches 210-1 . . . 210-9, 212-1 . . . 212-9 and/or the output of the RORD 204 and, optionally, the filtering of the WMU 150.

The controller 206 may include programmable hardware elements and/or a combination of hardware, software and firmware. For example, the controller 206 may be a microcontroller, e.g., including a CPU, memory (e.g., read/write and/or read-only), and/or peripherals capable of input and output. In another example, the controller 206 may be implemented as an ASIC, i-, e.g., a "system on a chip," or a field programmable gate array (FPGA), or the like.

Figure 3:
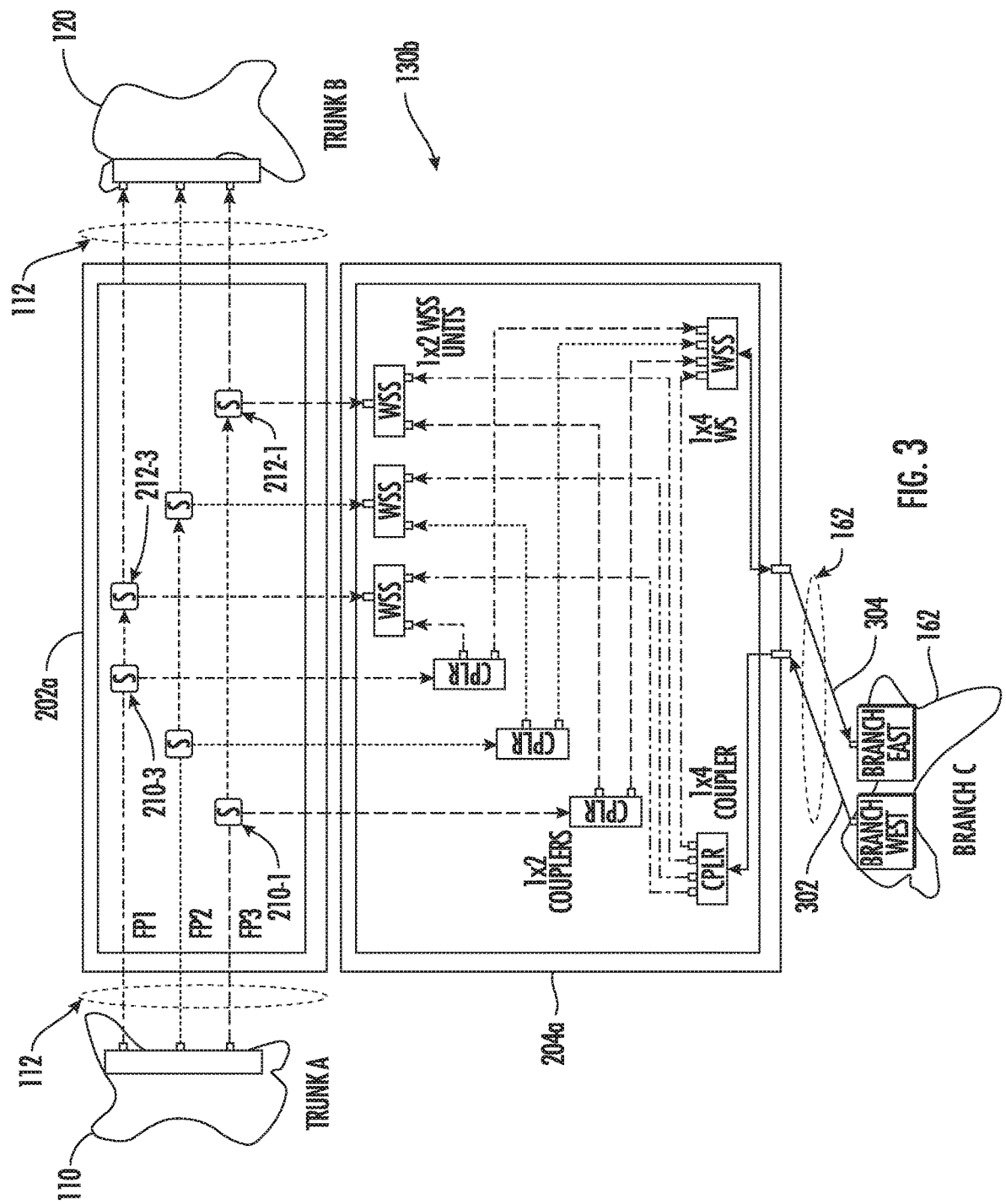
FIG. 3 is a schematic illustration of an optical communication system consistent with the present disclosure including another example of a fiber pair switching branching unit consistent with the present disclosure.

FIG. 3 diagrammatically illustrates a system consistent with the present disclosure including another example of a FPS-BU 130b including a bypass switch portion 202a and a RORD 204a. The bypass switch portion 202a is generally configured as described in connection with FIG. 2, but includes three west side optical switches 210-1 . . . 210-3 and three east side optical switches 212-1 . . . 212-3. The RORD 204a includes three 1×2 optical couplers/splitters, a 1×4 optical coupler/splitter, three 1×2 wavelength selective optical switches (WSSs) and a 1×4 WSS. The state of the optical switches and the outputs of the WSSs may each be selectively controlled by a controller, e.g. controller 204 (FIG. 2) in response to a remote command signal.

For simplicity embodiments are described herein as including WSSs. It is to be understood, however, the WSSs are examples of optical routing devices. The optical routing devices may be provided in a variety of configurations of single or multiple components. Examples of optical devices that may be used to provide functionality an optical routing device include, without limitation, optical switches, couplers, tunable optical filters, variable optical attenuators, and wavelength selective switches (WSSs).

Each of the west side optical switches 210-1 . . . 210-3 is configured to selectively couple an associated west side trunk cable 112 fiber pairs to an input port of an associated one of the 1×2 optical couplers. Each of the east side optical switches 212-1 . . . 212-3 is configured to selectively couple an associated east side trunk cable fiber pair to an output port of an associated one of the 1×2 WSSs. A branch cable add fiber 302 is coupled the input of the 1×4 optical coupler and a branch cable drop fiber 304 is coupled to the output of the 1×4 WSS. Each of the 1×2 couplers has a first output coupled to an associated one of the 1×2 WSSs and a second associated output coupled to an associated input of the 1×4 WSS. Three of the outputs of the 1×4 coupler are coupled to an input of an associated one of the 1×2 WSSs and one of the outputs of the 1×4 coupler is coupled to an input port of the 1×4 WSS.

With this configuration any signal from the branch add fiber 302 may be coupled to any of the east side fiber pairs through the 1×2 WSSs and the associated east side optical switches 212-1 . . . 213-3. Also, any signal to be dropped to the branch drop fiber 304 may be coupled to the branch drop fiber 304 through the west side switches 210-1 . . . 210-3, the associated 1×2 coupler, and the 1×4 WSS.

Figure 4:
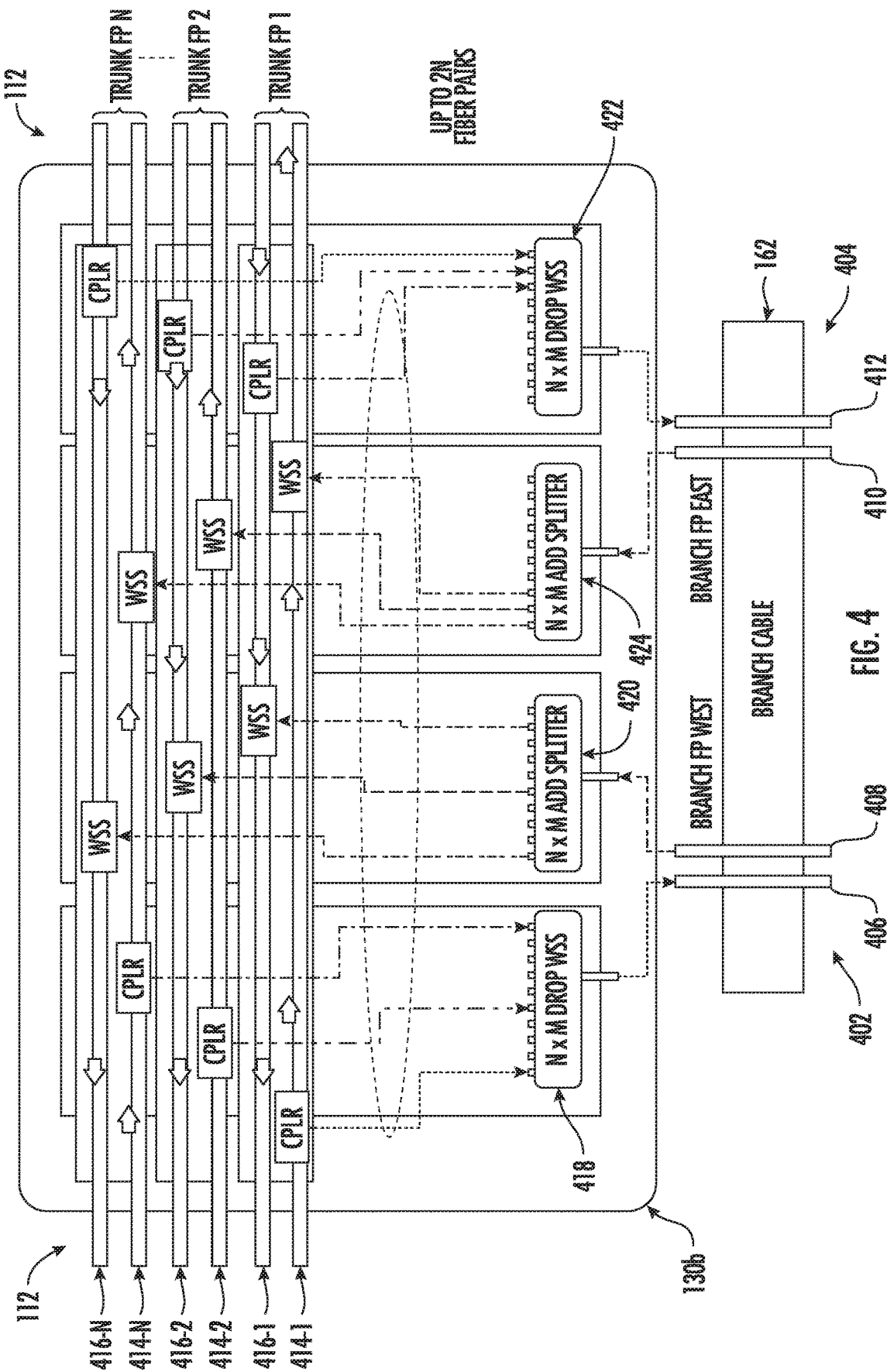
FIG. 4 is a functional block diagram of another one example of a fiber pair switching branching unit consistent with the present disclosure.

FIG. 4 illustrates another example of a FPS-BU 130c consistent with the present disclosure. In general, in the FPS-BU 130c optical couplers are used to tap each input trunk fiber to obtain a copy of the inbound optical spectrum and connect it to the optical filtering devices, e.g. WSSs. The inbound spectra on each on trunk fiber is filtered and combined to form the output spectrum on each drop fiber of the branch cable. The outbound spectrum on each add fiber of the branch cable is filtered and combined with the trunk traffic on each trunk output fiber of the trunk cable to form the output spectrum on each trunk output fiber.

In particular, the illustrated FPS-BU 103c may be viewed as having a west side portion for selectively and controllably routing signals to/from the trunk cable 112 to a west side branch cable fiber pair 402 and an east side portion for selectively and controllably routing signals to/from the trunk cable and an east side branch cable fiber pair 404. The west side branch cable fiber pair 402 includes a drop fiber 406 for dropping signals from the trunk cable 112 to the branch cable 162 and an add fiber 408 for adding signals from the branch cable 162 to the trunk cable 112. The east branch side branch cable fiber 404 pair includes a drop fiber 412 for dropping signals from the trunk cable 112 to the branch cable 162 and an add fiber 410 for adding signals from the branch cable 162 to the trunk cable 112.

The trunk cable in the illustrated embodiment includes N fiber pairs FP1 . . . FPN. Fibers 414-1 . . . 414-N carry east bound signals from a west trunk terminal and fibers 416-1 . . . 416-N carry west bound signals from an east trunk terminal. The west side portion of the FPS-BU 103c includes an optical coupler coupled to each of the fibers 414-1 . . . 414-N carrying east bound signals, a WSSs coupled to each of the fibers carrying a west bounds signals 416-1 . . . 416-N, a N×M drop WSS 418 and an N×M add optical splitter/coupler 420. In the illustrated example embodiment M=1 for simplicity and ease of explanation. It is to be understood, however, that M may be any number depending on the intended application of the FPS-BU 103c.

Each of the couplers couples a portion of the east bound signal to an input of the drop WSS 418. The output of the drop WSS 418 is coupled to the west side branch cable drop fiber 406. Each of the WSSs is coupled to an output of the splitter 420. The input to the splitter 420 is coupled to the west side branch cable add fiber 408. The state of the outputs of the WSSs may each be selectively controlled by a controller, e.g. controller 204 (FIG. 2) in response to a remote command signal.

The east side portion of the FPS-BU 103c includes an optical coupler coupled to each of the fibers 416-1 . . . 416-N carrying west bound signals, a WSSs coupled to each of the fibers 414-1 . . . 414-N carrying east bounds signals, a N×M drop WSS 422 and an N×M add optical splitter/coupler 424. Each of the couplers couples a portion of the east bound signal to an input of the drop WSS 422. The output of the drop WSS 422 is coupled to the west side branch cable drop fiber 412. Each of the WSSs is coupled to an output of the splitter 424. The input to the splitter 424 is coupled to the west side branch cable add fiber 410. The state of the outputs of the WSSs may each be selectively controlled by the controller, e.g. controller 204 (FIG. 2) in response to a remote command signal.

Advantageously, embodiments described herein allow routing optical spectrum from N trunk cable fiber pairs onto M branch cable fiber pairs, without a fixed one-to-one correlation between the trunk and branch cable fiber pairs. Spectrum from any trunk cable fiber pair can be routed onto a shared smaller group of branch cable fiber pairs, allowing the branch cable fiber pairs to be utilized more efficiently and possibly at full capacity when needed. Spectrum from fewer trunk cable fiber pairs may also be routed onto more branch cable fiber pairs, for example with N=4 and M=8.

A system consistent with the present disclosure is not limited to the examples described herein and can be provided in a variety of configurations. For example, the embodiment shown in FIG. 4 may be described as a "broadcast and select" configuration. However, the positions of the couplers, N×M drop WSS, the WSSs and the N×M splitter could be reversed to provide a "filter and combine" architecture consistent with the present disclosure. Also, the selectively controllable RORD, WSSs, N×M drop WSS and/the N×M add splitter can be implemented as single units, or may be implemented with a combination of lower port count optical filter devices. A system consistent with the present disclosure could be implemented with single-instance or with redundant reconfigurable optical filtering units on each path.

According to one aspect of the present disclosure, there is provided an optical communication system including: a trunk terminal configured to provide trunk signals on a plurality of fiber pairs of a trunk cable; a branch terminal configured to provide a branch add signal on a branch cable; and a fiber pair switching branching unit coupled to the trunk cable and the branch cable for receiving the trunk signals and the branch add signal, the branching unit including: at least a first optical routing device coupled to the trunk cable and configured to receive the trunk signals from each of the plurality of fiber pairs, the first optical routing device being controllable to couple signals from selected one of the plurality of fiber pairs to a drop fiber of the branch cable; and at least a second optical routing device coupled to the branch cable and configured to receive the branch add signal from the branch cable, the second optical routing device being controllable to couple the branch add signal to a fiber of one of the plurality of fiber pairs.

According to another aspect of the disclosure, there is provided a fiber pair switching branching unit including: at least a first optical routing device configured to be coupled to a trunk cable and receive trunk signals from each of a plurality of fiber pairs of the trunk cable, the first optical routing device being controllable to couple signals from selected one of the plurality of fiber pairs to a drop fiber of a branch cable; and at least a second optical routing device coupled to the branch cable and configured to receive the branch add signal from the branch cable, the second optical routing device being controllable to couple the branch add signal to a fiber of one of the plurality of fiber pairs.

According to another aspect of the disclosure there is provided an optical communication system including a trunk terminal configured to provide trunk signals on a plurality of fiber pairs of a trunk cable; a branch terminal configured to provide a branch add signal on a branch cable; and a fiber pair switching branching unit coupled to the trunk cable and the branch cable for receiving the trunk signals and the branch add signal, the branching unit comprising: at least one optical routing device coupled to the trunk cable and the branch cable, the optical routing device configured to receive the trunk signals from each of the plurality of fiber pairs and being controllable to couple signals from any one of the plurality of fiber pairs to a drop fiber of the branch cable and being configured to receive the branch add signal from the branch cable and being controllable to couple the branch add signal to any one of the plurality of fiber pairs.

According to another aspect of the disclosure there is provided a fiber pair switching branching unit including at least one optical routing device configured to be coupled to a trunk cable extending between first and second cable landing stations and to receive trunk signals from each of a plurality of fiber pairs of the trunk cable, the at least one optical routing device being further configured to be coupled to a branch cable coupled to a branch station and to receive a branch add signal from the branch cable, the at least one optical routing device being controllable to couple signals from any one of the plurality of fiber pairs to a drop fiber of the branch cable and being controllable to couple the branch add signal to any one of the plurality of fiber pairs.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the controller 204 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals. Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Obviously, many modifications and variations may become apparent in light of the above teachings. Many additional changes in the details, materials, and arrangement of parts, herein described and illustrated, may be made by those skilled in the art.

What is claimed is:

1. An optical communication system comprising:
a fiber switching branching unit coupled to a trunk cable and a branch cable, the branching unit comprising:
an optical routing device comprising:
at least a first trunk port configured to receive trunk signals from a first fiber pair of the trunk cable, the first fiber pair being associated with a first optical spectrum,
a first branch port configured to drop the received trunk signals from the first fiber pair of the trunk cable to a first drop fiber of the branch cable, and
a second branch port configured to drop the received trunk signals from the first fiber pair of the trunk cable to a second drop fiber of the branch cable, and
wherein the optical routing device is configured to receive a control signal and selectively route the received trunk signals from the first fiber pair to the first branch port or the second branch port based on the control signal such that first optical spectrum associated with the first fiber pair of the trunk cable is dropped entirely to the first drop fiber or the second drop fiber.

2. The optical communication system of claim 1, wherein the first branch port is further configured to add branch signals from a first add fiber of the branch cable and wherein the second branch port is further configured to add branch signals from a second add fiber of the branch cable.

3. The optical communication system of claim 2, wherein the optical routing device further comprises a second trunk port and wherein the optical routing device is configured to selectively route (i) the branch signals from the first add fiber to the first trunk port or the second trunk port or (ii) the branch signals from the second add fiber to the first trunk port or the second trunk port.

4. The optical communication system of claim 1, wherein the optical routing device further comprises a second trunk port configured to receive trunk signals from a second fiber pair of the trunk cable, the second fiber pair being associated with a second optical spectrum.

5. The optical communication system of claim 4, wherein the optical routing device is further configured to selectively route the received trunk signals from the second fiber pair to the first branch port or the second branch port based on the control signal such that second optical spectrum associated with the second fiber pair of the trunk cable is dropped entirely to the first drop fiber or the second drop fiber.

6. The optical communication system of claim 1, wherein the optical routing device further comprises a wavelength selective switch.

7. The optical communication system of claim 4, wherein the optical routing device is coupled to the first and second fiber pairs of the trunk cable via associated optical couplers.

8. The optical communication system of claim 1, wherein the optical routing device is coupled to the branch cable via associated optical splitters.

9. The optical communication system of claim 4, wherein the optical routing device is coupled to the first and second fiber pairs of the trunk cable via associated optical switches.

10. The optical communication system of claim 1, wherein the control signal is sent from a controller and is representative of a remote command signal transmitted on a supervisory channel of a wavelength division multiplexed (WDM) signal transmitted on the trunk cable or the branch cable.

11. An optical routing device comprising:
at least a first trunk port configured to receive trunk signals from a first fiber pair of the trunk cable, the first fiber pair being associated with a first optical spectrum;
a first branch port configured to drop the received trunk signals from the first fiber pair of the trunk cable to a first drop fiber of a branch cable; and
a second branch port configured to drop the received trunk signals from the first fiber pair of the trunk cable to a second drop fiber of the branch cable, and
wherein the optical routing device is configured to receive a control signal and selectively route the received trunk signals from the first fiber pair to the first branch port or the second branch port based on the control signal such that first optical spectrum associated with the first fiber pair of the trunk cable is dropped entirely to the first drop fiber or the second drop fiber.

12. The optical routing device of claim 11, wherein the first branch port is further configured to add branch signals from a first add fiber of the branch cable and wherein the second branch port is further configured to add branch signals from a second add fiber of the branch cable.

13. The optical routing device of claim 12, further comprising a second trunk port and further configured to selectively route (i) the branch signals from the first add fiber to the first trunk port or the second trunk port or (ii) the branch signals from the second add fiber to the first trunk port or the second trunk port.

14. The optical routing device of claim 11, further comprising a second trunk port configured to receive trunk signals from a second fiber pair of the trunk cable, the second fiber pair being associated with a second optical spectrum.

15. The optical routing device of claim 14, further configured to selectively route the received trunk signals from the second fiber pair to the first branch port or the second branch port based on the control signal such that second optical spectrum associated with the second fiber pair of the trunk cable is dropped entirely to the first drop fiber or the second drop fiber.

16. A method comprising:
receiving, via a first trunk port, trunk signals from a first fiber pair of a trunk cable;
receiving a control signal; and
routing, selectively, the received trunk signals to a first branch port or a second branch port based on the received control signal, and
wherein the first fiber pair of the trunk cable is associated with a first optical spectrum,
wherein the first branch port is configured to drop the trunk signals from the first fiber pair of the trunk cable to a first drop fiber of a branch cable,
wherein the second branch port is configured to drop the trunk signals from the first fiber pair to a second drop fiber of the branch cable, and
wherein the first optical spectrum associated with the first fiber pair of the trunk cable is dropped entirely to the first drop fiber or the second drop fiber.

17. The method of claim 16, wherein the first branch port is further configured to add branch signals from a first add fiber of the branch cable and wherein the second branch port is further configured to add branch signals from a second add fiber of the branch cable.

18. The method of claim 17, further comprising routing, selectively, (i) the received branch signals from the first add fiber to the first trunk port or a second trunk port or (ii) the received branch signals from the second add fiber to the first trunk port or the second trunk port.

19. The method of claim 16, further comprising receiving, via a second trunk port, trunk signals from a second fiber pair of the trunk cable, the second fiber pair being associated with a second optical spectrum.

20. The method of claim 19, further comprising routing, selectively, the received trunk signals from the second fiber pair to the first branch port or the second branch port based on the control signal, and wherein the second optical spectrum associated with the second fiber pair of the trunk cable is dropped entirely to the first drop fiber or the second drop fiber.

* * * * *